United States Patent [19]
Müller et al.

[11] Patent Number: 5,964,814
[45] Date of Patent: *Oct. 12, 1999

[54] STEERING ANGLE ADJUSTING DEVICE FOR A MOTOR VEHICLE

[75] Inventors: Manfred Müller, Nürnberg; Werner Reichelt, Esslingen; Peter Frank; Lutz Eckstein, both of Stuttgart; Micahel Böhringer, Waiblingen, all of Germany

[73] Assignee: DaimlerChrysler AG, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/771,925

[22] Filed: Dec. 23, 1996

[30] Foreign Application Priority Data

Dec. 23, 1995 [DE] Germany ............... 195 48 713

[51] Int. Cl.$^6$ ............... G06G 7/76; B62D 5/06
[52] U.S. Cl. ............... 701/41; 701/42; 180/415; 180/412; 180/422
[58] Field of Search ............... 701/29, 41, 42, 701/43; 180/421, 417, 423, 415, 422, 442, 410, 412, 444, 447, 446, 197

[56] References Cited

U.S. PATENT DOCUMENTS

| | | | |
|---|---|---|---|
| 3,022,850 | 2/1962 | Bidell et al. ............... | 180/77 |
| 4,718,685 | 1/1988 | Kawabe et al. ............... | 180/415 |
| 4,878,557 | 11/1989 | Shibahata et al. ............... | 701/42 |
| 4,940,103 | 7/1990 | Momiyama ............... | 180/422 |
| 4,951,198 | 8/1990 | Watanabe et al. ............... | 701/41 |
| 5,010,488 | 4/1991 | Ohshita et al. ............... | 701/42 |
| 5,229,955 | 7/1993 | Nishiwaki et al. ............... | 701/40 |
| 5,261,503 | 11/1993 | Yasui ............... | 180/142 |
| 5,297,646 | 3/1994 | Yamamura et al. ............... | 180/415 |
| 5,316,098 | 5/1994 | Akita et al. ............... | 180/415 |
| 5,365,439 | 11/1994 | Momose et al. ............... | 701/41 |
| 5,482,130 | 1/1996 | Shimizu ............... | 180/447 |
| 5,642,281 | 6/1997 | Ishida et al. ............... | 701/41 |

FOREIGN PATENT DOCUMENTS

| | | |
|---|---|---|
| 0 150 589 | 8/1985 | European Pat. Off. . |
| 0 353 995 | 2/1990 | European Pat. Off. . |
| 0 407 716 | 1/1991 | European Pat. Off. . |
| 44 03 379 | 8/1994 | Germany . |
| 6-183361 | 7/1994 | Japan . |
| 1 443 676 | 7/1976 | United Kingdom . |
| 2 042 999 | 10/1980 | United Kingdom . |
| 2 274 818 | 8/1994 | United Kingdom . |

OTHER PUBLICATIONS

*Ingenieurs de L'Autombile,* No. 671, Mar. 1, 1992, pp. 22–24 entitled "Une Saab Sans Volant!"

P. Bränneby et al., "Improved Active and Passive Safety byt Using Active Lateral Dynamic Control and an Unconventional Steering Unit," 13th International Technical Conference on Experimental Safety Vehicles, Proceedings, vol. 1, Nov. 4–7, 1991, pp. 224–230.

H. Bubb, "Arbeitsplatz Fahrer—Eine ergonomische Studie [The Driver Workstation: an Ergonomic Study]," Automobil–Industrie, Mar. 1985, pp. 265–274.

*Primary Examiner*—Jacques H. Louis-Jacques
*Attorney, Agent, or Firm*—Evenson, McKeown, Edwards & Lenahan, PLLC

[57] ABSTRACT

The invention relates to a steering angle adjusting device with an operating element for adjusting the steering angle as a function of a corresponding operating element actuating parameter. According to the invention, steering angle adjustment takes place as a function of the operating element actuating parameter with a sensitivity that decreases with decreasing coefficient of friction and/or the maximum adjustable value of the operating element actuating value decreases with a decreasing coefficient of friction and/or an increasing lengthwise speed of the vehicle.

8 Claims, 2 Drawing Sheets

STEERING ANGLE ADJUSTING DEVICE FOR A MOTOR VEHICLE

BACKGROUND AND SUMMARY OF THE INVENTION

The invention relates to a steering angle adjusting device for a motor vehicle, said device comprising an operating element by which the steering angle can be adjusted as a function of a corresponding operating element actuating parameter such as the deflection of the operating element or the force exerted on said element.

Conventionally, a steering wheel serves as the operating element for adjusting the steering angle in automobiles, with the steering wheel actuating force being transmitted directly by mechanical means to the vehicle wheels. At the same time, the user experiences a feedback at the steering wheel that is a function of the situation and indicates to him how easily the steering angle can be changed in a given situation. Steering systems are already known in which the steering wheel is eliminated, such as when a joystick is used as the operating element to adjust the steering angle. In such systems, the adjustment of the steering angle takes place as a function of the deflection of the joystick or the actuating force exerted on the stick as a corresponding operating element actuating parameter, for which a corresponding characteristic is provided. The actuation of the operating element is decoupled mechanically from the steering angle movement of the vehicle wheels and the latter is performed instead by an adjusting drive that is controlled by a steering angle control unit as a function of the detected operating element actuating parameter.

A steering angle adjusting device of the latter type is known from the article by P. Bränneby et al., "Improved Active and Passive Safety by Using Active Lateral Dynamic Control and an Unconventional Steering Unit," 13th International Technical Conference on Experimental Safety Vehicles, Proceedings, Vol. 1, Nov. 4–7, 1991, Page 224, the disclosure of which is incorporated by reference herein as non-essential material. In this device a nonlinear characteristic of the steering angle is set as a function of the operating element deflection in such fashion that larger steering angle changes are performed with greater sensitivity than for smaller steering angle changes. In other words, a given change in deflection of the operating element results in a smaller steering angle change in the range of small steering angles than in the range of large steering angles.

In another steering angle adjusting device of this type, as described in H. Bubb, "Arbeitsplatz Fahrer-Eine ergonomische Studie [The Driver Workstation: an Ergonomic Study]," Automobil-Industrie, 3/85, Page 265, an operating element located approximately in the position of the steering wheel serves firstly to control the lengthwise dynamics by displacement parallel to the lengthwise direction of the vehicle and secondly to adjust the steering angle by twisting.

U.S. Pat. No. 3,022,850 describes a steering angle setting device in which a joystick serves simultaneously for adjusting the steering angle and for controlling the lengthwise dynamics of the vehicle, the specification of which is expressly incorporated by reference herein. In connection with the steering functionality, it is proposed that the joystick deflection signal be amplified as a function of speed, preferably in inverse proportion to the square of the lengthwise velocity so that a given joystick deflection leads to an essentially constant transverse acceleration that is independent of the lengthwise velocity of the vehicle.

The technical problem to be solved by the invention is to provide a steering angle adjusting device of the above-mentioned type that permits safe steering of the vehicle in terms of driving dynamics, especially for a system in which the angular movement of the vehicle wheels is not coupled mechanically with operating element actuation to adjust the steering angle.

This problem is solved by a steering angle adjusting device for a motor vehicle with an operating element for adjusting the steering angle as a function of a corresponding operating element actuating parameter. Steering angle adjustment is performed as a function of the operating element actuating value (x) with a sensitivity that decreases as the coefficient of friction ($\mu$) decreases. Further, it is contemplated that with an operating element for adjusting the steering angle as a function of a corresponding operating element actuating value, the maximum adjustable value ($x_t$) of the operating element-actuating value (x) in each case decreases with decreasing coefficient of friction ($\mu$) and/or increasing vehicle lengthwise and/or transverse motion (v).

According to the invention, the steering angle adjustment is performed with a sensitivity that depends on the current coefficient of friction in such fashion that steering angle adjustment sensitivity is reduced as the road surface becomes smoother and the coefficient of friction decreases. In this way, when the vehicle reaches a smoother road surface, the risk of excessive steering interventions on the wheels, which could result in unstable driving behavior, is prevented. A similar effect is achieved by the measure for reducing the value of the operating element actuating parameter, which is the maximum that can be set in the given situation, with a declining coefficient of friction and increasing vehicle lengthwise velocity, so that the maximum steering angle that can be set is correspondingly reduced in a simple fashion. This measure can possibly be provided in addition to the above-described measure.

Other objects, advantages and novel features of the present invention will become apparent from the following detailed description of the invention when considered in conjunction with the accompanying drawings.

DETAILED DESCRIPTION OF THE DRAWINGS

Figure 1:
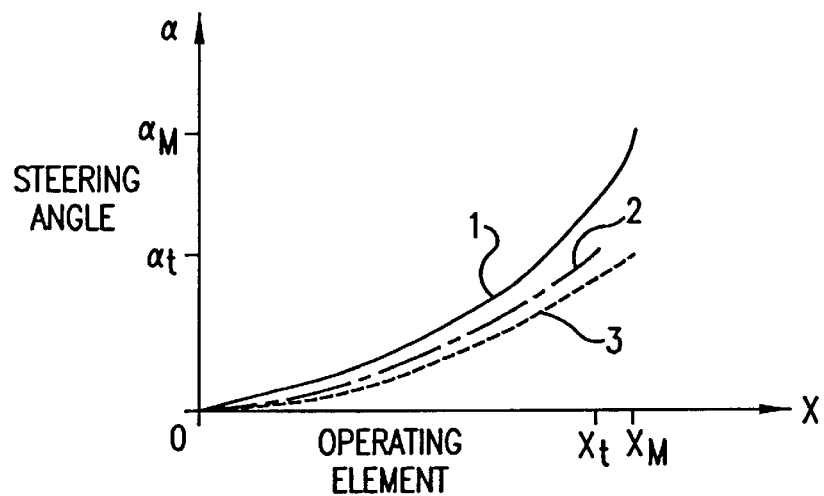
FIG. 1 is a graph showing the steering angle plotted as a function of operating element deflection for a steering angle adjusting device of a motor vehicle.
Figure 2:
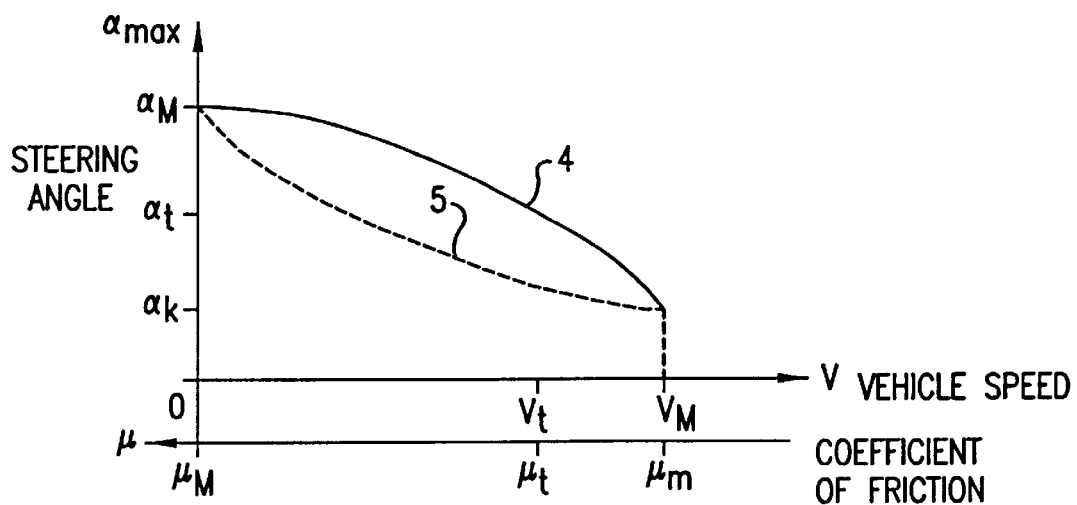
FIG. 2 is a graph showing the curves of the maximum adjustable steering value that can be produced by the steering angle adjusting device as a function of the lengthwise and transverse motions of the vehicle and/or the coefficient of friction.

FIGS. 1 and 2 graph different characteristics to illustrate the function of a suitably designed steering angle adjusting device for a motor vehicle whose design is essentially of a conventional type and therefore requires no representation in the drawing. In particular, the steering angle adjusting device can include a joystick instead of a steering wheel as the operating element for adjusting the steering angle, with the deflection of said stick or the actuating force exerted on the stick serving as a measure of the steering angle to be set, as is known from the prior art recited n the background section. As a novel feature, the steering angle adjusting device is designed so that the sensitivity of adjustment of the steering angle by the operating element and/or the maximum adjustable value of the corresponding operating element actuating parameter can be changed as a function of the lengthwise velocity of the vehicle and/or the coefficient of friction, and this measure will now be described in detail.

In FIG. 1, a characteristic (1) is plotted as a solid curve that shows the functional dependence of the steering angle value ($\alpha$) that can be set by actuating the operating element of a steering angle adjusting device, on the deflection (x) of the operating element at a low lengthwise velocity (v) of the vehicle and a high coefficient of friction ($\mu$). In this case the operating element can be actuated from the resting position, i.e. x=0, up to a maximum deflection, i.e. x=$x_M$, in a first actuating direction or in a second actuating direction opposite to the first, with the steering angle adjusting device setting a corresponding steering angle to the right or left. The maximum deflection ($x_M$) corresponds to a corresponding maximum steering angle value ($\alpha_M$). The shape of characteristic (1) is nonlinear, and is convex in particular, so that steering angle adjustment takes place with less sensitivity in the range of smaller actuating element deflections (x) than at larger operating element deflections (x), in other words larger steering angle values ($\alpha$) and hence smaller steering angle values ($\alpha$).

The adjustment of steering angle values ($\alpha$) near the maximum steering angle value ($\alpha_M$), which is permitted at low vehicle speeds (v) with the vehicle nearly at rest, and high values of the coefficient of friction ($\mu$), could lead to undesired instabilities of driving dynamics at higher vehicle speeds (v) or relatively low coefficients of friction ($\mu$). A first possibility for preventing this consists in changing the sensitivity of the steering angle adjustment accordingly, in other words, reducing it with a decreasing coefficient of friction ($\mu$) or higher vehicle lengthwise velocity (v). Such a design of the steering angle adjusting device is illustrated for example by the dashed curve (3) in FIG. 1. The permitted deflection range for the operating element of the steering angle adjusting device in this case is unchanged, i.e. the operating element can still be operated from the resting position up to the maximum deflection ($x_M$). As a result of the reduced sensitivity of the steering angle adjustment because of the increased vehicle speed (v) or reduced coefficient of friction ($\mu$), however, the maximum deflection ($x_M$) corresponds only to a reduced maximally adjustable steering angle ($\alpha_r$) that is smaller than the maximum deflection angle ($\alpha_M$), which can be set only at very low vehicle speeds (v) and high coefficients of friction ($\mu$). It is clear that, depending on the application, sensitivity can be reduced either only as a function of a decreasing coefficient of friction ($\mu$) or only as a function of increasing vehicle speed (v), or jointly as a function of both parameters. In the latter case, the linkage can consist for example in separate curves for the adjustment sensitivity being set firstly as a function of vehicle speed (v) and secondly as a function of the coefficient of friction ($\mu$); of the two sensitivity values that result from them, the lower is chosen as the critical sensitivity value by means of a minimum selection unit.

Alternatively or in addition to the measure described above, provision can be made to limit the deflection travel of the operating element of the steering angle adjusting device as a function of vehicle speed (v) or the coefficient of friction ($\mu$). A combination of this measure with a change in sensitivity is represented by curve (2) plotted as a dot-dashed line in FIG. 1. This curve (2) represents a situation in which an increased vehicle speed ($v_r$) or a relatively low coefficient of friction ($\mu$) prevails. In this case, the sensitivity is initially reduced somewhat in contrast to the situation with a low vehicle speed (v) and a high coefficient of friction ($\mu$), as indicated by the flatter slope of curve (2) by comparison to curve (1) shown as a solid line in FIG. 1. In addition, as a result of the increased vehicle speed ($v_r$) or reduced coefficient of friction ($\mu_r$), the maximum adjustable operating element deflection that could be permitted in this situation is limited to a reduced deflection value ($x_r$) that is smaller than the maximum deflection ($x_M$) that is permissible with a low vehicle speed (v) and high coefficient of friction ($\mu$). With this combination of the two steering angle limiting methods, the adjustable steering angle ($\alpha$) in the example shown is again limited in desired fashion to a maximum adjustable steering angle ($\alpha_r$) reduced as a function of the situation. It is understood that in order to determine the situation-dependent reduced maximum deflection value ($x_r$) corresponding to the analogous measure for determining the adjustment sensitivity, a functional dependence on either the vehicle speed (v) alone, or on the coefficient of friction ($\mu$) alone, or on a combination of the two values, can be set. In the latter case, the critical situation-dependent maximum deflection value ($x_r$) is again obtained by a minimum selection of a speed-dependent characteristic and a value determined from a characteristic that depends on the coefficient of friction. The deflection limitation obtained for the operating element of the steering angle setting device can then be implemented for example by a mechanical stop displaced in suitable fashion, such stops being known to those skilled in the art.

In FIG. 2, the reduction of the maximum adjustable steering value ($\alpha_{max}$) achieved by the above-described measures as a function of vehicle speed and/or coefficient of friction is illustrated, with vehicle speed (v) being plotted on the abscissa and increasing to the right, and the coefficient of friction ($\mu$) plotted increasing to the left. A first embodiment is represented by solid curve (4) that shows the situation-dependent maximum adjustable steering angle value ($\alpha_{max}$) decreasing from a maximum steering angle ($\alpha_M$) to a lower maximum adjustable steering angle ($\alpha_k$) when the vehicle speed (v) increases from zero to maximum speed ($v_M$) or the coefficient of friction ($\mu$) falls from a maximum value ($\mu_M$) to a minimum value ($\mu_m$) For example, this curve (4) can be derived from the above-mentioned reduced maximum steering angle ($\alpha_r$) that is obtained with an increased speed ($v_r$) or reduced coefficient of friction ($\mu_r$). With a combination of steering angle limitation, and as a function of vehicle speed (v) as well as coefficient of friction ($\mu$), the smaller of the two maximum adjustable steering angles ($\alpha_{max}$) obtained from curve (4) applies. In addition to the concave shape shown for curve (4) with respect to the limitation of the situation-dependent maximum adjustable steering angle ($\alpha_{max}$), depending on the system design, a straight-line or convex characteristic can also be provided. The latter case is shown in FIG. 2 as another possible example by a curve (5) plotted with dashed lines.

Another advantageous design for the steering angle adjusting device keeps the sensitivity of the steering angle adjustment constant independently of vehicle speed (v) and coefficient of friction ($\mu$), and merely limits the deflection travel for the operating element of the steering angle adjusting device as a function of at least one of these two values (v, $\mu$). In the graph of FIG. 1 this means that the shape of solid curve (1) will be retained in all driving situation but the right-hand end of this curve (1), depending on vehicle speed (v) or coefficient of friction ($\mu$), will be displaced along curve (1), with a corresponding shortening of the latter.

Figure 3:
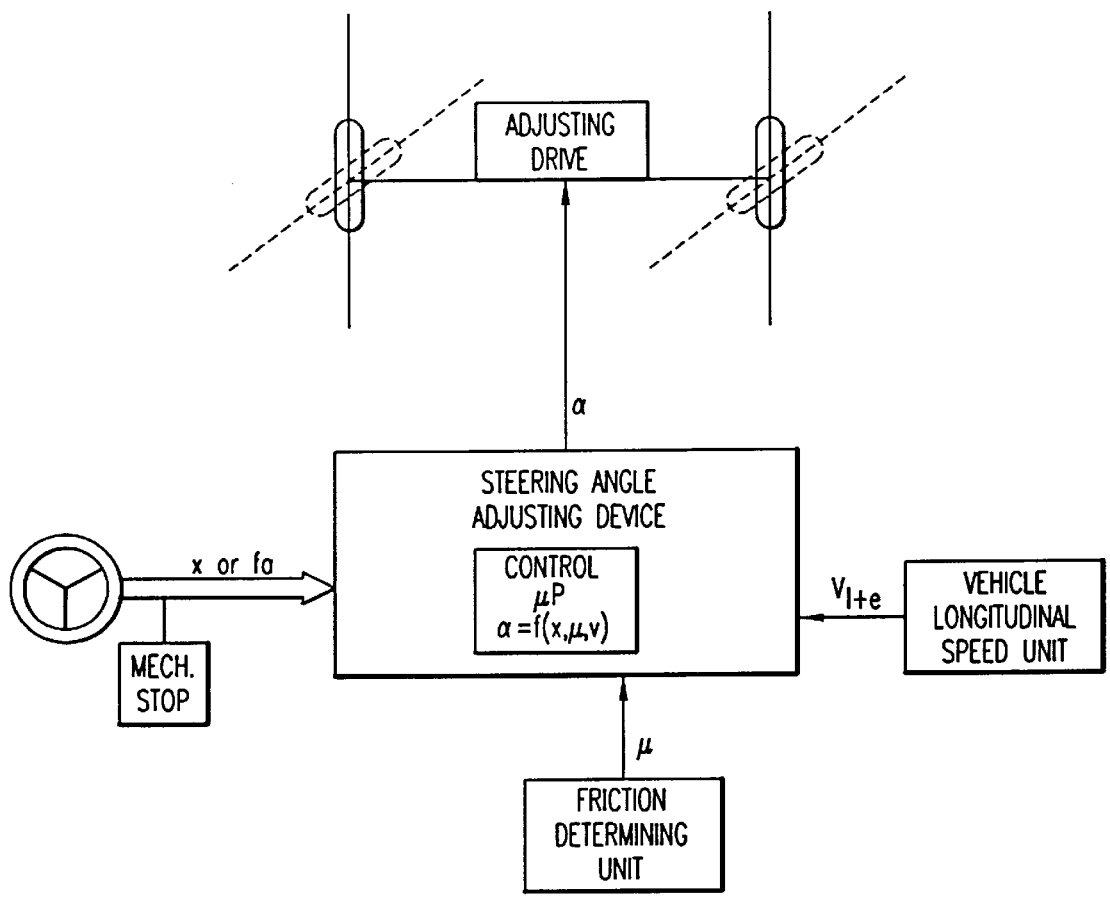
FIG. 3 is schematic block diagram illustrating the steering angle adjusting device according to the present invention.

Referring to FIG. 3, there is shown a schematic block diagram of the steering angle adjusting device according to the present invention. The steering angle adjusting device outputs a set steering angle value (α) to an adjusting drive for the vehicle wheels. The steering angle adjusting device receives as inputs the coefficient of friction ($\mu$) from a friction determining unit and the vehicle longitudinal and transverse speeds ($v_l$, $v_t$) from a vehicle speed determining unit. Also, the operating element such as a steering wheel or a joystick provides a deflection signal (x) to the steering angle adjusting device. The extent of the actuating or deflection signal (x) can be limited by a mechanical stop for example. Alternatively, as described above for preferred embodiments, an actuating force signal ($f_A$) can be provided to the steering angle adjusting device. The steering angle adjusting device can be implemented as a microprocessor control unit which calculates the steering angle signal α as a function of the deflection signal, coefficient of friction, and the longitudinal and transverse speeds, or any combination of same, programmed appropriately. Of course, one skilled in the art would readily recognize that the steering angle adjusting device can be formed of a hard wired logic circuit, or some combination of microprocessor control and hard wired logic circuitry.

By means of each of these implementations according to the invention regarding the design of the steering angle adjusting device as a function of speed and/or coefficient of friction, triggered by corresponding operating element actuation, instabilities in driving behavior of the motor vehicle caused by excessive steering interventions can be reliably prevented. Of course, the actuating force exerted on the operating element can be chosen as the critical actuating parameter of the operating element instead of the operating element deflection described. For the sake of completeness, it should be mentioned that devices on the vehicle for determining the respective coefficient of friction ($\mu$) during driving are known, for example in the form of units that detect the rotational speed of the wheels and evaluate it, and therefore require no particular explanation here.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering angle adjusting device for a motor vehicle having an operating element which adjusts a steering angle as a function of a corresponding operating element actuating variable, wherein the steering angle adjusting device comprises a control unit which adjusts the steering angle as a function of the operating element actuating variable with a sensitivity that decreases as a coefficient of friction between the vehicle and a road decreases.

2. The steering angle adjusting device according to claim 1, wherein a maximum adjustable value of the operating element actuating variable in each case decreases with at least one of the decreasing coefficient of friction between the vehicle and the road, an increasing vehicle lengthwise motion, and an increasing vehicle traverse motion.

3. A steering angle adjusting device for a motor vehicle, comprising:

an operating element providing an operating element actuating variable;

a friction determining unit providing a coefficient of friction signal indicating a coefficient of friction between the vehicle and a road;

a vehicle speed unit providing a vehicle longitudinal speed signal; and a steering angle adjusting device including a microprocessor which receives said operating element actuating variable, said coefficient of friction signal, and said vehicle longitudinal speed signal, said microprocessor being programmed to calculate a steering angle adjustment as a function of the operating element actuating variable with a sensitivity such that for a given variable value, the steering angle adjustment decreases as the coefficient of friction signal decreases or the vehicle longitudinal speed increases.

4. The device according to claim 3, wherein the ooperating element actuating variable is a deflection signal indicating an amount of deflection of the operating element.

5. A steering angle adjusting device for a motor vehicle having an operating element which adjusts a steering angle of steered wheels as a function of a corresponding operating element actuating variable, and wherein the steering angle adjusting device comprises a control unit which adjusts a maximum value of the operating element actuating variable such that in each case the maximum value decreases with at least one of a decreasing coefficient of friction, an increasing vehicle lengthwise motion, and an increasing vehicle transverse motion;

whereby a maximum steering angle is decreased.

6. A process for adjusting a steering angle of a motor vehicle having an operating element, the process comprising the acts of:

determining a coefficient of friction between the motor vehicle and a road;

detecting an operating element actuating variable of the operating element; and adjusting the steering angle of the steered wheels via a control unit as a function of the operating element actuating variable such that for a given variable value, the steering angle is adjusted with a sensitivity that decreases as the coefficient of friction decrease.

7. A process of adjusting a steering angle of steered wheels of a motor vehicle having an operating element, the process comprising the acts of:

determining a coefficient of friction, a vehicle lengthwise motion, and a vehicle transverse motion;

detecting an operating element actuating variable of the operating element; and adjusting a maximum adjustable value of the operating element actuating variable via a control unit such that in each case the maximum adjustable value decreases with at least one of a decreasing coefficient of friction, an increasing vehicle lengthwise motion, and an increasing vehicle transverse motion;

whereby a maximum steering angle is decreased.

8. A steering angle adjusting device for a motor vehicle having an operating element which adjusts a steering angle as a function of a corresponding operating element actuating variable, wherein the steering angle adjusting device comprises a control unit which adjusts the steering angle as a function of the operating element actuating variable with a sensitivity such that for a given variable value, the steering angle is adjusted with a sensitivity that decreases as a coefficient of friction between the vehicle and a road decreases.

* * * * *